(12) United States Patent
Aten et al.

(10) Patent No.: US 11,414,858 B2
(45) Date of Patent: Aug. 16, 2022

(54) TWO-WAY ACOUSTIC PANEL

(71) Applicant: Rohr, Inc., Chula Vista, CA (US)

(72) Inventors: Michael Aten, San Diego, CA (US); John J. Anderson, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 693 days.

(21) Appl. No.: 16/225,284

(22) Filed: Dec. 19, 2018

(65) Prior Publication Data

US 2020/0199866 A1    Jun. 25, 2020

(51) Int. Cl.
| | | |
|---|---|---|
| *E04B 1/82* | (2006.01) | |
| *G10K 11/178* | (2006.01) | |
| *E04B 1/84* | (2006.01) | |
| *G10K 11/168* | (2006.01) | |

(52) U.S. Cl.
CPC .............. *E04B 1/8209* (2013.01); *E04B 1/84* (2013.01); *G10K 11/168* (2013.01); *G10K 11/17861* (2018.01); *E04B 2001/8428* (2013.01)

(58) Field of Classification Search
CPC .. E04B 1/84; E04B 1/8209; E04B 2001/8428; G10K 11/168; G10K 11/17861
USPC ........................................................ 181/295
See application file for complete search history.

(56) References Cited

U.S. PATENT DOCUMENTS

| | | | |
|---|---|---|---|
| 3,948,346 A | | 4/1976 | Schindler |
| 4,611,444 A | * | 9/1986 | Nassof .................... E04B 9/001 |
| | | | 181/290 |
| 6,203,656 B1 | | 3/2001 | Syed |
| 6,871,725 B2 | | 3/2005 | Johnson |
| 8,079,443 B2 | | 12/2011 | Keller |
| 8,499,887 B2 | * | 8/2013 | Gleine ................ B60R 13/0815 |
| | | | 181/292 |
| 8,534,418 B2 | | 9/2013 | Pachale |
| 8,636,104 B2 | * | 1/2014 | Meyer ................... E04B 1/8209 |
| | | | 181/286 |
| 8,979,014 B2 | | 3/2015 | Boock et al. |
| 9,027,706 B2 | * | 5/2015 | Staudt .................. G10K 11/162 |
| | | | 181/295 |
| 9,505,200 B2 | | 11/2016 | Braden et al. |
| 9,546,602 B2 | | 1/2017 | Julliard et al. |
| 9,708,930 B2 | | 7/2017 | Koroly |
| 2005/0147790 A1 | | 7/2005 | Levavasseur |
| 2009/0173571 A1 | * | 7/2009 | Keller .................... B64C 1/066 |
| | | | 181/292 |

(Continued)

FOREIGN PATENT DOCUMENTS

| | | | |
|---|---|---|---|
| CN | 106042468 B | 1/2018 | |
| DE | 102006048376 B4 | * 4/2010 | ............. B64C 1/068 |

OTHER PUBLICATIONS

EP search report for EP19218207.9 dated Apr. 23, 2020.
EP Office Action for EP19218207.9 dated Jun. 4, 2021.

*Primary Examiner* — Forrest M Phillips
(74) *Attorney, Agent, or Firm* — Getz Balich LLC (57) ABSTRACT

An acoustic panel is provided that includes a first skin, a second skin and a core structure. The core structure is connected to and forms a plurality of cavities between the first skin and the second skin. The cavities include a first cavity and a second cavity. The first cavity is fluidly coupled with one or more first perforations in the first skin. The second cavity is fluidly coupled with one or more second perforations in the second skin.

17 Claims, 7 Drawing Sheets

(56) References Cited

U.S. PATENT DOCUMENTS

2014/0134389 A1* 5/2014 Humfeldt .................. B64C 1/40
   428/99
2018/0099475 A1 4/2018 Tyan et al.

* cited by examiner

TWO-WAY ACOUSTIC PANEL

BACKGROUND

1. Technical Field

This disclosure relates generally to a sound attenuation and, more particularly, to an acoustic panel for attenuating sound associated with, for example, aircraft operation.

2. Background Information

An aircraft may include a plurality of acoustic panels for attenuating noise generated by, for example, its engines and windage. Various types and configurations of acoustic panels are known in the art. While these known acoustic panels have various advantages, there is still room in the art for improvement.

SUMMARY OF THE DISCLOSURE

According to an aspect of the present disclosure, an acoustic panel is provided that includes a first skin, a second skin and a core structure. The core structure is connected to and forms a plurality of cavities between the first skin and the second skin. The cavities include a first cavity and a second cavity. The first cavity is fluidly coupled with one or more first perforations in the first skin. The second cavity is fluidly coupled with one or more second perforations in the second skin . . . .

According to another aspect of the present disclosure, another acoustic panel is provided that includes a first skin, a second skin, a septum, a first cellular core and a second cellular core. The first cellular core is bonded to and forms a plurality of first cavities between the first skin and the septum. Each of the first cavities is fluidly coupled with one or more first perforations in the first skin. The second cellular core is bonded to and forms a plurality of second cavities between the second skin and the septum. Each of the second cavities is fluidly coupled with one or more second perforations in the second skin.

According to still another aspect of the present disclosure, a wall structure is provided for an aircraft. This wall structure includes an exterior fuselage skin and an acoustic panel arranged with the exterior fuselage skin. The acoustic panel includes a first skin, a second skin and a core structure connected to and forming a plurality of cavities between the first skin and the second skin. The first cavity is fluidly coupled with one or more first perforations in the first skin. The second cavity is fluidly coupled with one or more second perforations in the second skin.

The septum may (e.g., fluidly, acoustically) isolate the first cavity(ies) from the second cavity(ies).

The core structure may include a septum that partially defines and is between the first cavity and the second cavity.

The septum may be a non-porous solid septum.

The core structure may also include a first cellular core and a second cellular core. The first cavity may extend through the first cellular core between the first skin and the septum. The second cavity may extend through the second cellular core between the second skin and the septum.

The first cellular core may be configured as or otherwise include a first honeycomb core. In addition or alternatively, the second cellular core may be configured as or otherwise include a second honeycomb core.

The core structure may include a first cellular core, a second cellular core and a septum bonded to and between the first cellular core and the second cellular core. The first cavity may be within the first cellular core. The second cavity may be within the second cellular core.

The first skin may be configured from or otherwise include a first material. The second skin may be configured from or otherwise include a second material that is different from the first material.

The second skin may be configured from or otherwise include wood.

The second skin may be configured from or otherwise include polymer material.

The first cavity may have a first height. The second cavity may have a second height that is different than the first height.

The acoustic panel may be separated from the exterior fuselage skin by an air gap.

A plurality of mounts may be included and attach the acoustic panel to the exterior fuselage skin.

A first of the mounts may be configured as or otherwise include a vibration-isolating mount.

The core structure may be configured as or otherwise include a solid septum partially defining and between the first cavity and the second cavity.

The core structure may also include a first cellular core and a second cellular core. The first cavity may be in the first cellular core between the first skin and the solid septum. The second cavity may be in the second cellular core between the second skin and the solid septum.

The core structure may include a first cellular core, a second cellular core and a septum bonded to and between the first cellular core and the second cellular core. The first cavity may extend through the first cellular core between the first skin and the septum. The second cavity may extend through the second cellular core between the second skin and the septum.

The foregoing features and the operation of the invention will become more apparent in light of the following description and the accompanying drawings.

DETAILED DESCRIPTION

Figure 1:
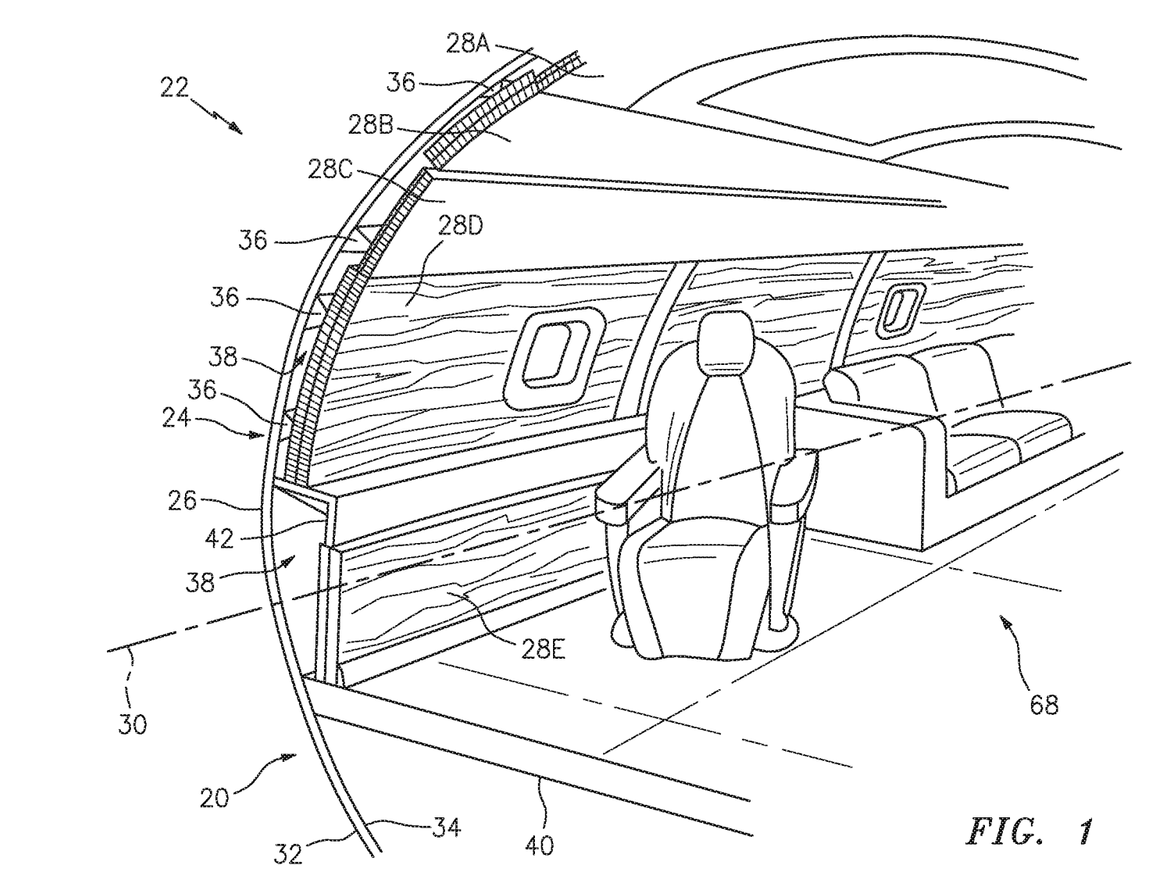
FIG. 1 is a partial, perspective sectional illustration of a fuselage for an aircraft, in accordance with various embodiments.

FIG. 1 is a partial, perspective sectional illustration of a fuselage 20 for an aircraft 22 such as, but not limited to, an airplane. This fuselage 20 is configured with a (e.g., tubular) fuselage wall structure 24, which wall structure 24 forms an exterior (e.g., outermost) tubular wall of the aircraft 22. The wall structure 24 includes an exterior fuselage skin 26 and one or more acoustic panels 28A-E (generally referred to as "28").

The exterior fuselage skin 26 extends circumferentially about (e.g., partially or completely around) and longitudinally along a longitudinal centerline 30 of the fuselage 20. The exterior fuselage skin 26 is configured to form an exterior (e.g., outermost, radial outer) surface 32 of the fuselage 20, which surface 32 is an exterior aerodynamic flow surface of the aircraft 22. The exterior fuselage skin 26 extends radially outward, relative to the centerline 30, from an interior (e.g., radial inner) surface 34 of the exterior fuselage skin 26 to the exterior surface 32 of the exterior fuselage skin 26. The exterior fuselage skin 26 of FIG. 1 is configured as a single layer skin/sheet; e.g., a single panel of material (e.g., sheet metal) extends between and forms the exterior and the interior surfaces 32 and 34. However, in other embodiments, the exterior fuselage skin 26 may be configured as a multi-layer skin; e.g., a laminated multi-ply skin. The present disclosure therefore is not limited to any particular exterior fuselage skin configurations nor materials.

Figure 2:
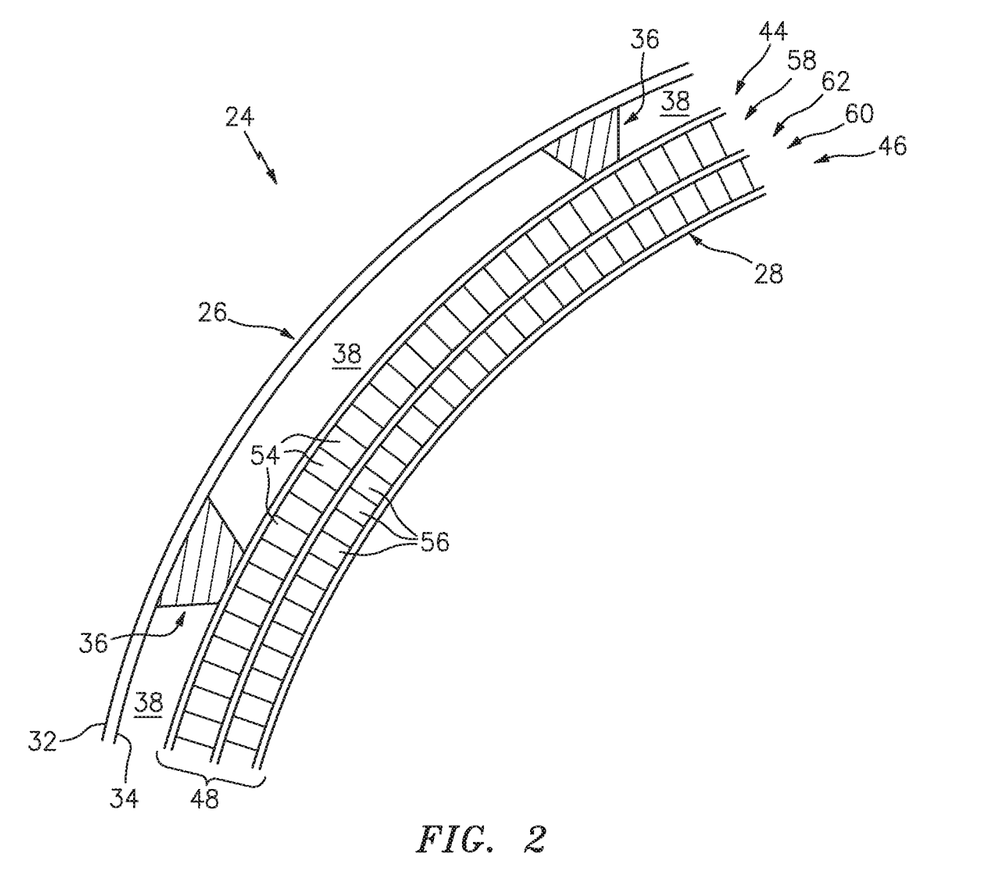
FIG. 2 is a partial sectional illustration of a fuselage wall structure, in accordance with various embodiments.

The acoustic panels 28 are arranged with the exterior fuselage skin 26 and within an interior of the fuselage 20. For example, each of the acoustic panels 28A-D is connected (e.g., mechanically fastened and/or otherwise attached) to the exterior fuselage skin 26, at its interior surface 34, through one or more mounts 36 (not all visible in FIG. 1). Each of these mounts 36 may be a vibration-isolating mount. Each mount 36, for example, may be constructed from elastomeric (e.g., rubber) material. The mounts 36 are thereby configured to dampen and/or limit/prevent transmission of vibrations between the exterior fuselage skin 26 and the acoustic panels 28. The mounts 36 are also configured to provide an air gap 38 (e.g., an air plenum) between the exterior fuselage skin 26 and the acoustic panels 28; see also FIG. 2. This air gap 38 may increase sound attenuation performance by providing, for example, an additional resonance chamber between the exterior fuselage skin 26 and the acoustic panels 28. Of course, one or more of the acoustic panels 28 (e.g., the acoustic panels 28E) may also or alternatively be connected to the exterior fuselage skin 26 through other intermediate elements; e.g., a floor structure 40 and/or a shelf/trim structure 42. The present disclosure therefore is not limited to any particular technique for mounting the acoustic panels 28 to the exterior fuselage skin 26.

Figure 3:
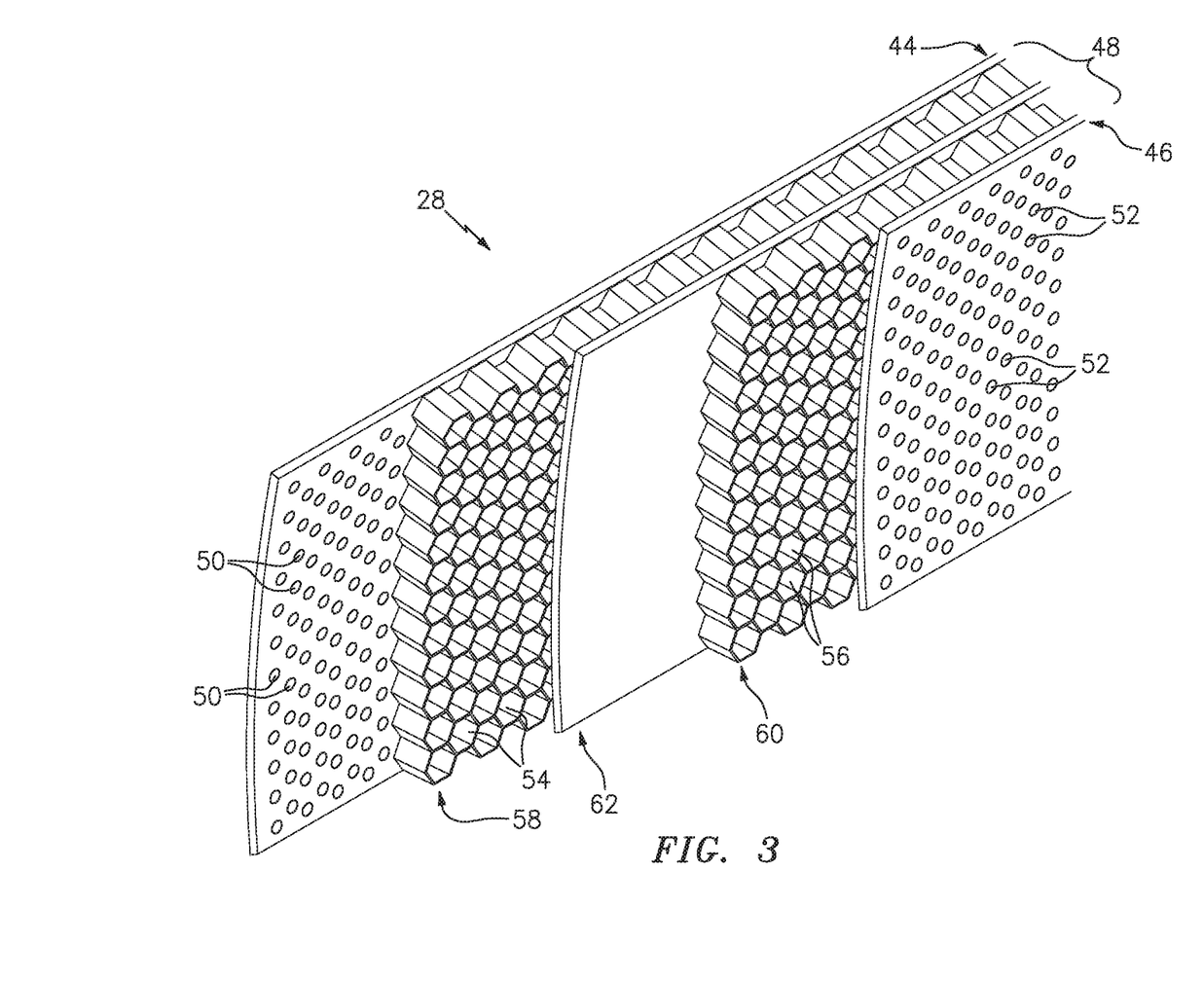
FIG. 3 is a partial, perspective cutaway illustration of an acoustic panel, in accordance with various embodiments.
Figures 4, 9:
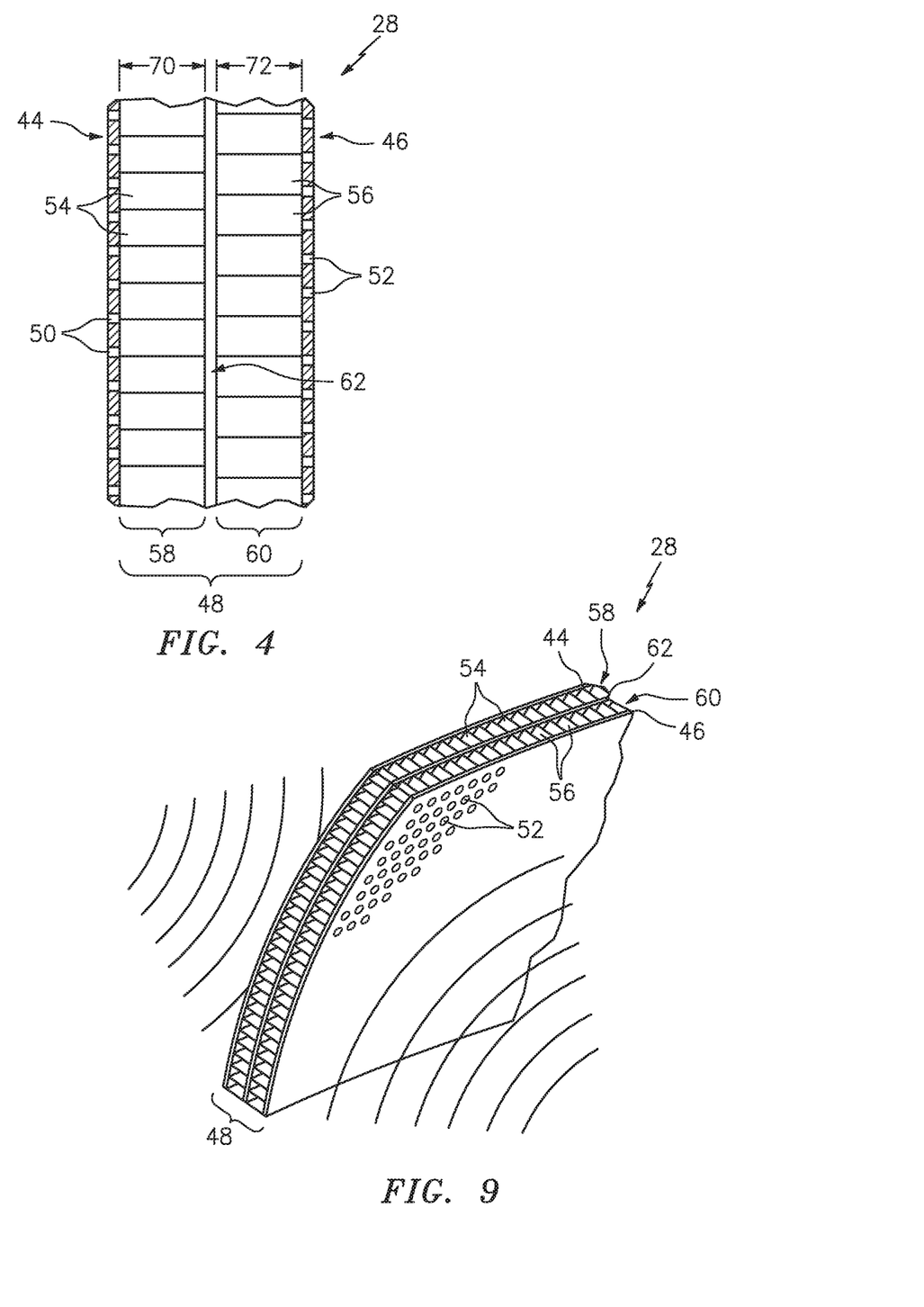
FIG. 4 is a partial sectional illustration of the acoustic panel, in accordance with various embodiments.
FIG. 9 is a partial perspective illustration of the acoustic panel during operation, in accordance with various embodiments.

Referring to FIGS. 3 and 4, each of the acoustic panels 28 includes a perforated first (e.g., radial outer) skin 44, a perforated second (e.g., radial inner) skin 46 and a core structure 48. Briefly, the core structure 48 is disposed and extends radially between the first skin 44 and the second skin 46. The core structure 48 is also connected to the first skin 44 and the second skin 46 as described below in further detail.

The first skin 44 of FIGS. 3 and 4 may be configured as a relatively thin sheet or layer of material that extends longitudinally and circumferentially about the centerline 30 (see FIG. 1). This first skin 44 has a radial thickness that extends vertically between opposing outer and inner side surfaces. The first skin 44 includes a plurality of first perforations 50 (see FIG. 3); e.g., apertures such as through-holes. Each of these first perforations 50 extends generally radially completely through the first skin 44 between its side surfaces.

The second skin 46 of FIGS. 3 and 4 may be configured as a relatively thin sheet or layer of material that extends longitudinally and circumferentially about the centerline 30 (see FIG. 1). This second skin 46 has a radial thickness that extends vertically between opposing outer and inner side surfaces. The second skin 46 includes a plurality of second perforations 52; e.g., apertures such as through-holes. Each of these second perforations 52 extends generally radially completely through the second skin 46 between its side surfaces.

The core structure 48 is configured to form one or more first cavities 54 and one or more second cavities 56 between the first skin 44 and the second skin 46. The core structure 48 of FIGS. 3 and 4, for example, includes a first cellular core 58, a second cellular core 60 and a fluid impervious (e.g., solid, unperforated, non-porous) septum 62.

Figure 5:
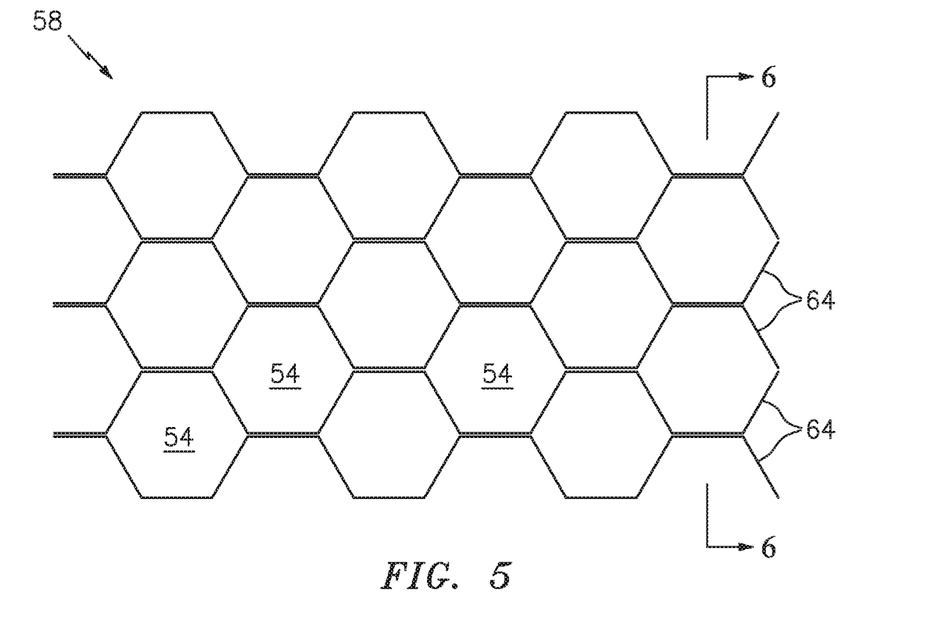
FIG. 5 is a partial illustration of a first cellular core, in accordance with various embodiments.
Figure 6:
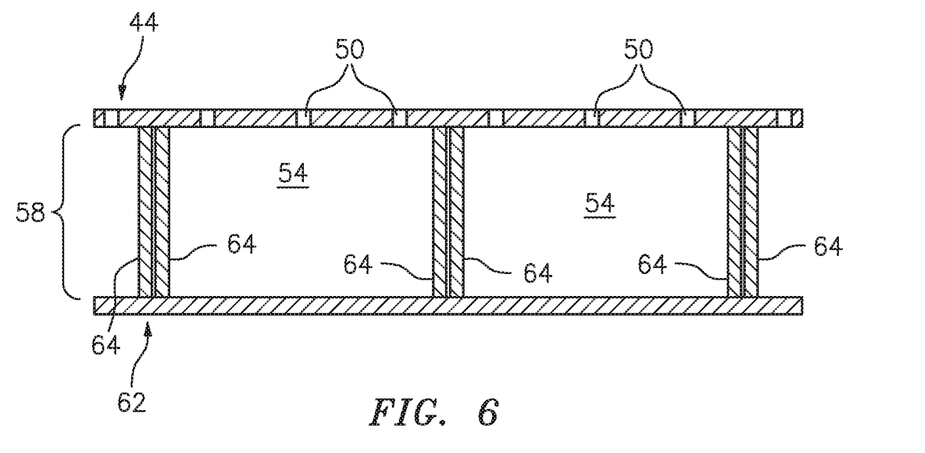
FIG. 6 is a partial section illustration of a portion of the acoustic panel taken along line 6-6 in FIG. 5, in accordance with various embodiments.

The first cellular core 58 is configured to form the one or more first cavities 54. For example, the first cellular core 58 may be configured as a honeycomb core. The first cellular core 58 of FIGS. 5 and 6 includes a plurality of corrugated sidewalls 64. These sidewalls 64 are arranged in a side-by-side array and connected to one another such that each adjacent pair of sidewalls 64 forms an array of the first cavities 54 therebetween. Each of these first cavities 54 extends radially through the first cellular core 58 to and between the first skin 44 and the septum 62. Each first cavity 54 may thereby be fluidly coupled with one or more of the first perforations 50 in the first skin 44. Referring to FIG. 5, each first cavity 54 may have a polygonal (e.g., hexagonal) cross-sectional geometry when viewed in a plane parallel to one or more of the elements 44 and 62. The present disclosure, however, is not limited to any particular first cellular core configurations.

Figure 7:
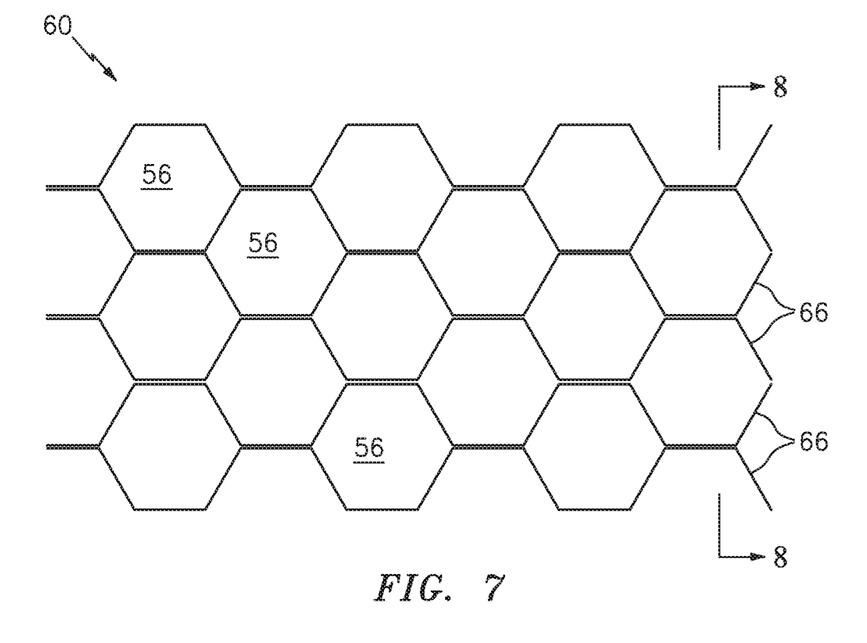
FIG. 7 is a partial illustration of a second cellular core, in accordance with various embodiments.
Figure 8:
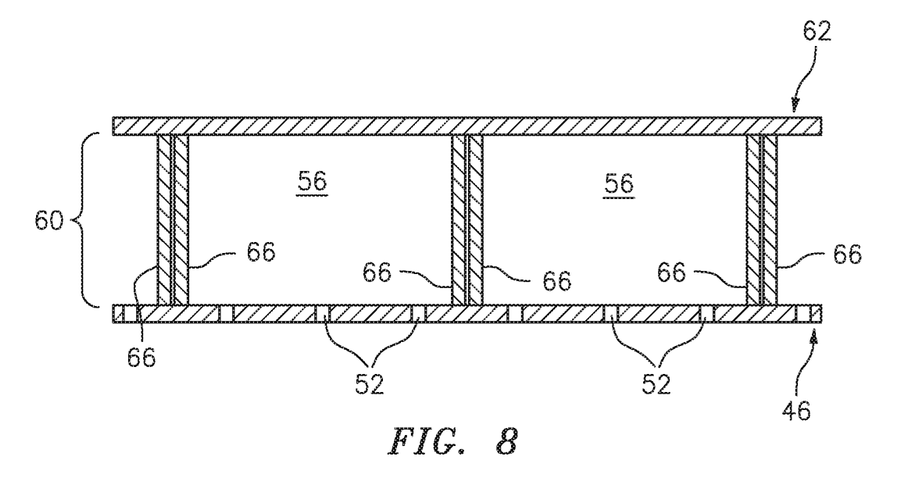
FIG. 8 is a partial section illustration of another portion of the acoustic panel taken along line 8-8 in FIG. 7, in accordance with various embodiments.

The second cellular core 60 (e.g., see FIG. 4) is configured to form the one or more second cavities 56 (e.g., see FIG. 9). For example, the second cellular core 60 may be configured as a honeycomb core. The second cellular core 60 of FIGS. 7 and 8 includes a plurality of corrugated sidewalls 66. These sidewalls 66 are arranged in a side-by-side array and connected to one another such that each adjacent pair of sidewalls 66 forms an array of the second cavities 56 therebetween. Each of these second cavities 56 extends radially through the second cellular core 60 to and between the second skin 46 and the septum 62 (e.g., see FIG. 4). Each second cavity 56 may thereby be fluidly coupled with one or more of the second perforations 52 in the second skin 46. Referring to FIG. 7, each second cavity 56 may have a polygonal (e.g., hexagonal) cross-sectional geometry when viewed in a plane parallel to one or more of the elements 46 and 62. The present disclosure, however, is not limited to any particular second cellular core configurations.

The septum 62 of FIGS. 3 and 4 may be configured as a relatively thin sheet or layer of (e.g., continuous and uninterrupted) material that extends longitudinally and circumferentially about the centerline 30. This septum 62 is arranged radially between and connected to the first cellular core 58 and the second cellular core 60. The septum 62, for example, may be fused, adhered, welded, brazed and/or otherwise bonded to the first cellular core 58 and/or the second cellular core 60. The septum 62 may also or alternatively be mechanically fastened to the first cellular core 58 and/or the second cellular core 60. Alternatively, the septum 62 may be formed integral with the first cellular core 58 and/or the second cellular core 60 as a monolithic body using, for example, additive manufacturing. Each of the first and the second cellular cores 58 and 60 may be similarly respectively connected to (e.g., bonded, fastened and/or integral with) the first and the second skins 44 and 46. The present disclosure, however, is not limited to any particular acoustic panel manufacturing methods.

By arranging the septum 62 between the first and the second cellular cores 58 and 60, the septum 62 is radially between and defines respective ends of the first and the second cavities 54 and 56. In addition, the septum 62 fluidly isolates each of the first cavities 54 from the second cavities 56 and, similarly, fluidly isolates each of the second cavities 56 from the first cavities 54. Thus, each of the cavities 54, 56 may form a discrete resonance chamber for sound suppression. Each cavity 54, 56 may also be tailored to attenuate different acoustic tones.

Referring to FIG. 9, during operation, each acoustic panel 28 is operable to attenuate sound (e.g., noise) from two different directions; thus, the acoustic panel 28 may be termed a two-way acoustic panel. The first cellular core 58 and the first cavities 54 are operable to attenuate sound generated and/or propagating outside of the fuselage 20 (see FIG. 1). At the same time, the second cellular core 60 and the second cavities 56 are operable to attenuate sound generated and/or propagating inside the fuselage 20; e.g., within an aircraft cabin 68 of FIG. 1. The acoustic panels 28 may thereby be operable to significantly reduce sound hear by passengers within the fuselage 20.

The components 44, 46, 48, 58, 60 and 62 of the acoustic panel 28 may be constructed from various materials and in various configurations. Any one or more of the components 44, 46, 48, 58, 60 and 62, for example, may be constructed from polymer material, fiber reinforced composite (e.g., fiberglass composite, carbon fiber composite, aramid fiber composite, composite reinforced by any combination of glass, carbon, aramid or other fibers), metal (e.g., sheet metal), metal matrix composite, ceramic and ceramic matrix composite, or a combination of any two or more of the foregoing materials.

In some embodiments, the components 44, 46, 48, 58, 60 and 62 of the acoustic panel 28 are constructed from similar or like materials; e.g., the same materials. However, in other embodiments, one or more or each of the components 44, 46, 48, 58, 60 and 62 may be constructed from different materials. For example, the first skin 44 may be constructed from a first material and the second skin 46 may be constructed from a second material that is different from the first material. The first skin 44, for example, may be constructed from an industrial/aesthetically unfinished material such as sheet metal or a fiber-reinforced composite. By contrast, the second skin 46 may be constructed from an aesthetically finished material such as wood (e.g., solid wood or wood laminate/veneer) or textured polymer (e.g., plastic). Thus, the first skin material may be selected for cost reduction whereas the second skin material may be selected for aesthetic appearance, which may be particularly advantageous where the second skin 46 forms an exposed surface in the aircraft cabin as shown, for example, in FIG. 1.

Figure 10:
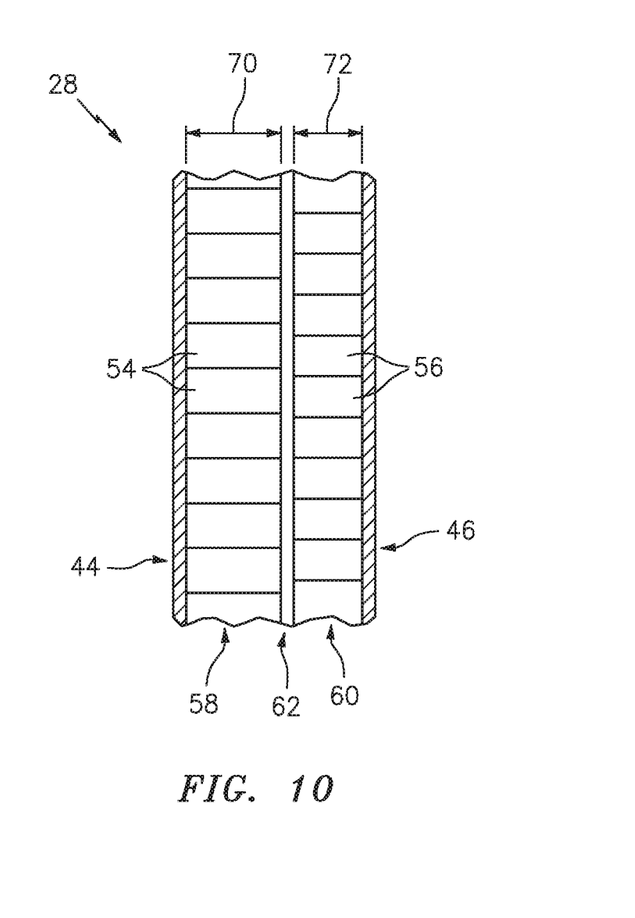
FIG. 10 is a partial sectional illustration of another acoustic panel, in accordance with various embodiments.
Figure 11:
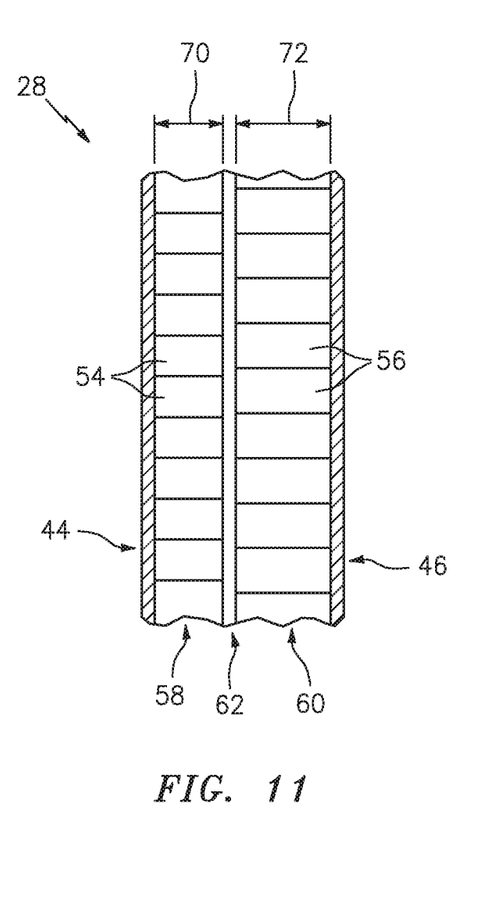
FIG. 11 is a partial sectional illustration of still another acoustic panel, in accordance with various embodiments.

In some embodiments, the first cellular core 58 and the second cellular core 60 have substantially (e.g., +/−2%) or exactly equal thicknesses 70 and 72 as shown in FIG. 4. Thus, each first cavity 54 may have a height (e.g., same as 70) that is substantially (e.g., +/−2%) or exactly equal to a height (e.g., same as 72) of each second cavity 56. However, in other embodiments, the thickness 70 of the first cellular core 58 may be greater than the thickness 72 of the second cellular core 60 as shown in FIG. 10. Thus, the height of each first cavity 54 may be greater than the height of each second cavity 56. In still other embodiments, the thickness 70 of the first cellular core 58 may be less than the thickness 72 of the second cellular core 60 as shown in FIG. 11. Thus, the height of each first cavity 54 may be less than the height of each second cavity 56. This enables each core 58, 60 and its cavities 54, 56 to be tuned for a frequency/frequencies of sound that core is intended to attenuate. Of course, this tuning may also involve selecting perforations hole sizes, selecting perforation spacings and/or selecting the number of perforations (e.g., density of perforation per unit of area–percent open area (POA)).

The acoustic panels 28 are described above with reference to an aircraft application. However, such acoustic panels 28 may also be configured for non-aircraft applications; e.g., building applications. The acoustic panels 28 of the present disclosure therefore are not limited to any particular applications.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A wall structure for an aircraft, comprising:
a fuselage component; and
an acoustic panel including
a first skin;
a second skin; and
a core structure connected to and forming a plurality of cavities between the first skin and the second skin, the cavities including a first cavity and a second cavity, the first cavity fluidly coupled with one or more first perforations in the first skin, the second cavity fluidly coupled with one or more second perforations in the second skin, the core structure comprising a septum that partially defines and is between the first cavity and the second cavity, the septum fluidly isolating the first cavity from the second cavity, and the septum comprising a non-porous solid septum.

2. The wall structure of claim 1, wherein the fuselage component comprises an exterior skin of a fuselage.

3. The wall structure of claim 1, further comprising a plurality of mounts attaching the acoustic panel to the fuselage component, a first of the mounts comprising a vibration- isolation mount.

4. The wall structure of claim 3, wherein the vibration-isolation mount comprises elastomeric material.

5. The wall structure of claim 1, wherein
the core structure further comprises a first cellular core and a second cellular core;
the first cavity extends through the first cellular core between the first skin and the septum; and the second cavity extends through the second cellular core between the second skin and the septum.

6. The wall structure of claim 5, wherein
the first cellular core comprises a first honeycomb core; and
the second cellular core comprises a second honeycomb core.

7. The wall structure of claim 1, wherein
the core structure comprises a first cellular core, a second cellular core and a septum bonded to and between the first cellular core and the second cellular core;
the first cavity is within the first cellular core; and
the second cavity is within the second cellular core.

8. The wall structure of claim 1, wherein
the first skin comprises a first material; and
the second skin comprises a second material that is different from the first material.

9. The wall structure of claim 1, wherein the second skin comprises wood.

10. The wall structure of claim 1, wherein the second skin comprises polymer material.

11. The wall structure of claim 1, wherein
the first cavity has a first height; and
the second cavity has a second height that is different than the first height.

12. A wall structure for an aircraft, comprising:
an exterior skin of a fuselage of the aircraft;
an acoustic panel including
a first skin, a second skin, a septum, a first cellular core and a second cellular core;
the first cellular core bonded to and forming a plurality of first cavities between the first skin and the septum, each of the first cavities fluidly coupled with one or more first perforations in the first skin;
the second cellular core bonded to and forming a plurality of second cavities between the second skin and the septum, each of the second cavities fluidly coupled with one or more second perforations in the second skin; and
septum isolating the first cavities from the second cavities, and the septum configured as a non-porous solid septum; and
a plurality of mounts attaching the acoustic panel to the exterior skin, a first of the mounts comprising elastomeric material.

13. A wall structure for an aircraft, comprising:
an exterior fuselage skin;
an acoustic panel arranged with the exterior fuselage skin;
the acoustic panel comprising a first skin, a second skin and a core structure connected to and forming a plurality of cavities between the first skin and the second skin, and the plurality of cavities comprising a first cavity and a second cavity;
the first cavity fluidly coupled with one or more first perforations in the first skin; and
the second cavity fluidly coupled with one or more second perforations in the second skin;
the core structure comprising a solid septum partially defining and fluidly isolating the first cavity and the second cavity; and
a plurality of mounts attaching the acoustic panel to the exterior fuselage skin.

14. The wall structure of claim 13, wherein a first of the mounts comprises a vibration-isolating mount.

15. The wall structure of claim 13, wherein the acoustic panel is separated from the exterior fuselage skin by an air gap.

16. The wall structure of claim 13, wherein
the core structure further comprises a first cellular core and a second cellular core;
the first cavity is in the first cellular core between the first skin and the solid septum; and
the second cavity is in the second cellular core between the second skin and the solid septum.

17. The wall structure of claim 13, wherein
the core structure comprises a first cellular core, a second cellular core and a septum bonded to and between the first cellular core and the second cellular core;
the first cavity extends through the first cellular core between the first skin and the septum; and
the second cavity extends through the second cellular core between the second skin and the septum.

\* \* \* \* \*